United States Patent [19]

Hoskin et al.

[11] Patent Number: 4,859,717

[45] Date of Patent: Aug. 22, 1989

[54] CROSS-LINKED POLYVINYL ALCOHOLS AND OIL RESERVOIR PERMEABILITY CONTROL THEREWITH

[75] Inventors: Dennis H. Hoskin, Lawrenceville; Paul Shu, Princeton Junction, both of N.J.

[73] Assignee: Mobil Oil Corporation, New York, N.Y.

[21] Appl. No.: 93,274

[22] Filed: Sep. 4, 1987

[51] Int. Cl.$^4$ ............................................. C09K 7/00
[52] U.S. Cl. ...................................... 523/130; 166/270; 166/272; 166/295; 252/8.554; 524/503; 525/58
[58] Field of Search ............... 523/130; 524/503, 557; 525/58; 166/270, 272, 295; 252/8.554

[56] References Cited

U.S. PATENT DOCUMENTS

| | | | |
|---|---|---|---|
| 4,276,209 | 6/1981 | Petersen et al. | 525/58 X |
| 4,458,048 | 7/1984 | Schmitt | 524/557 |
| 4,458,052 | 7/1984 | Schmitt | 525/61 |
| 4,498,540 | 2/1985 | Morocco | 166/295 |
| 4,666,957 | 5/1987 | Marrocco | 523/130 |
| 4,708,974 | 11/1987 | Chang et al. | 523/130 |

Primary Examiner—Theodore E. Pertilla
Attorney, Agent, or Firm—Alexander J. McKillop; Charles J. Speciale; Stanislaus Aksman

[57] ABSTRACT

A novel cross-linked polymer is obtained by cross-linking polyvinyl alcohol with a cross-linking agent which is a mixture of a phenolic component and an aldehyde or a mixture of a naphtholic component and an aldehyde. The resulting polymer is exceptionally thermally stable and, therefore, can be used as an effective permeability control agent in all enhanced oil recovery operations, including steam flooding.

12 Claims, No Drawings

CROSS-LINKED POLYVINYL ALCOHOLS AND OIL RESERVOIR PERMEABILITY CONTROL THEREWITH

BACKGROUND OF THE INVENTION

1. Field of the Invention

This invention relates to cross-linked polyvinyl alcohols and to the use thereof in controlling the permeability of subterranean oil-bearing formations.

2. Discussion of Related Art

In the production of oil from subterranean oil reservoirs by various flooding techniques, especially waterflooding, it has become a common expedient to add various polymeric thickening agents to the flooding liquid, such as water, to decrease its mobility to a point where it approaches that of the crude oil which is to be displaced so as to improve the displacement of the oil from the reservoir. The use of polymers for this purose is often stated to be for mobility control.

Another problem which arises in the various flooding processes is that different strata or zones in the reservoir often possess different permeabilities so that displacing fluids enter the high permeability or "thief" zones in preference to zones of lower permeability where significant quantities of oil may be left unless measures are taken to at least partially plug the high permeability zones to divert the displacing fluid into the low permeability zones. Mechanical isolation of the thief zones has ben tried but vertical communication among reservoir strata often renders such measures ineffective. Physical plugging of the high permeability zones by cements and solid slurries has also been attempted with varying degress of success but the most serious drawback of this approach is the possiblity of permanently closing productive portions of the reservoir.

From these early experiences, the desirability of designing a viscous slug capable of sealing off the most permeable layers so that the floodwater or other driving fluid, such as gas or steam, would be diverted to the underswept, tighter regions of the reservoir, became evident. This led to the use of oil/water emulsions, gels and polymers for controlling the permeability of the formations in a process frequently called "profile control" or "flood conformance", a reference to control of the vertical permeability profile of the reservoir. Profile control agents which have been proposed include oil/water emulsions, gels, e.g., lignosulfonate gels and polymers, with polymers being the most extensively used in recent years.

Among the polymers so far examined for improving flood conformance are polyacrylamides, polysaccharides, celluloses, furfural-alcohol and acrylic/epoxy resins, silicates and polyisocyanurates. A major part of this work has been conducted with the polyacrylamides, both in their normal, non-crosslinked form, as well as in the form of metal complexes, as described, for example, in U.S. Pat. Nos. 4,009,755; 4,069,869 and 4,413,680. In either form, the beneficial effects derived from these polyacrimides seem to dissipate rapidly due to shear degradation during injection and sensitivity to reservoir brines, low pH and high temperature. To overcome these problems and to achieve deeper polymer penetration into the reservoir, dilute solutions of these polymers have sometimes been injected first and then complexed in situ.

Another group of polymeric thickeners which has received considerable attention for use in improving flooding are polysaccharides, particularly those produced by the action of bacteria of the genus Xanthomonas on carbohydrates. For example, U.S. Pat. Nos. 3,757,863 and 3,383,307 disclose a process for mobility control by the use of polysaccharides.

U.S. Pat. Nos. 3,741,307; 4,009,755; 4,069,869 disclose the use of polysaccharides in the control of reservoir permeability. U.S. Pat. No. 4,413,680 describes the use of cross-linked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man-made fractures in formations. The use of polyvalent metal ions for cross-linking polysaccharides is also discussed in U.S. Pat. No. 3,810,882.

The use of various block copolymers for mobility control in waterflooding operations is described in U.S. Pat. Nos. 4,110,232, 4,120,801 and 4,222,881, but their use for permeability control has not been suggestd.

Chung et al, U.S. Pat. No. 4,653,585, disclose the use of block copolymers, which may be cross-linked with polyvalent metal ions, as permeability control agents in enhanced oil recovery applications.

While a number of different compositions, such as polymers discussed above, have been proposed for permeability control, some of such agents may be unsuitable for use as permeability control agents under certain circumstances. For example, the polymers of Chung et al, may not be effectively cross-linked with polyvalent metal ions under all conditions encountered in the enhanced oil recovery applications, e.g., in acidic conditions commonly found in carbon dioxide ($CO_2$) flooding operations. Similarly, some polymers are unsuitable as permeability control agents used in conjunction with steam flooding operations because they lose their structural integrity (i.e., they undergo "syneresis") at a high temperatures generated during such operations. This has led to the development of so-called hostile environment (HE) polymers, such as those marketed by Phillips Petroleum and Hoechst. However, a need still exists in the art for permeability control agents which can be used for such applications in diverse reservoir conditions, such as steam flooding.

Accordingly, it is a primary object of the present invention to provide a composition of matter which is a cross-linked polyvinyl alcohol.

It is another object of the inention to provide a polymer gel which can be used effectively as a permeability control agent under the extreme temperature conditions encountered in steam flooding of underground formations.

Other objects of the invention will become apparent to those skilled in the art from the following description of the invention.

SUMMARY OF THE INVENTION

A cross-linked polymer is obtained by cross-linking polyvinyl alcohol or a derivative thereof with a cross-linking agent which is a mixture of a phenolic components and an aldehyde or a mixture of a naphtholic component and an aldehyde. The cross-linked polymer is an effective permeability control agent which is stable even at the high underground formation temperatures encountered during steam flooding oil recovery operations.

DETAILED DESCRIPTION OF THE INVENTION

Polyvinyl alcohol (PVA) is a known, commercially-available polymer prepared by replacing acetate groups of polyvinyl acetates with hydroxyl groups. The alcoholysis reaction proceeds most rapidly in a mixture of methanol and methyl acetate in the presence of catalytic amounts of alkali or mineral acids. The polyvinyl alcohol and the synthesis theroef are described in greater detail by D. L. Cincera in Kirk-Othmer *ENCYCLOPEDIA OF CHEMICAL TECHNOLOGY*, Third Edition, John Wiley & Sons, New York (1983), Volume 23, pages 848–865, the entire contents of which are incorporated by reference herein. Instead of the polyvinyl alcohol, a derivative thereof, mixtures of derivatives, or a mixture of PVA and one or more of its derivatives may also be used in the invention. The derivates must be stable at temperatures encountered in enhanced oil recovery operations utilizing steam flooding. Suitable derivatives are PVA ethoxylates and PVA sulfonates. The PVA sulfonates are disclosed by Schmitt in U.S. Pat. Nos. 4,458,048 and 4,458,052, the entire contents of which are incorporated herein by reference. PVA ethoxylates can be synthesized in a conventional base-catalyzed exthoxylation reaaction, e.g., by introducing ethylene oxide into a basic solution of PVA in a polar, non-aqueous solvent, such as dimethyl sulfoxide or hexamethylphosphoric triamide. A suitable base, such as sodium or sodium hydroxide, is added to the solvent to render the solution basic. Whether the PVA, a derivative thereof or mixtures of PVA and its derivatives are used in the synthesis of the composition of matter of this invention, it is preferred that they be hydrolyzed to at least some degree. A suitable degree of hydrolysis of the PVA or a derivative thereof is about 50% to about 100%, preferably about 75% to about 100%, and most preferably about 85% to about 100%. The PVA and the derivatives thereof can be purchased at the desired degree of hydrolysis and then derivitized, if desired, by conventional means. Whenever the terms "PVA" or "polyvinyl alcohol" are used herein, they are intended to encompass polyvinyl alcohol, derivatives thereof, a mixture of derivatives, or a mixture of polyvinyl alcohol and one or more derivatives thereof.

In one preferred embodiment of the invention, 88% hydrolyzed PVA of 125,000 molecular weight (MW) is used to the synthesis of the cross-linked polymer of this invention. In another preferred embodiment of the invention, 99% hydrolyzed PVA of 133,000 MW is used in the synthesis of the cross-linked polymer of the invention.

The cross-linking agent is a mixture of a phenolic component and an aldehyde or a mixture of a naphtholic component and an aldehyde.

Phenolic components suitable for use in the present invention are phenol or derivatives thereof, such as catechol, resorcinol, phloroglucinol, pyrogallol, 4,4'-diphenol, and 1,3-dihydroxynaphthalene. Other phenolic components that can be used include at least one member of selected oxidized phenolic materials of natural or synthetic origin, such as 1,4-benzoquinone; hydroquinone or quinhydrone; as well as a natural or modified tannin, such as quebracho or sulfomethylated quebracho possessing a degree of sulfomethylation (DSM) up to about 50. (See U.S. Pat. No. 3,344,063, Col. 3, lines 15-32, which is incorporated herein by reference). The DSM of sulfomethylated quebracho (SMQ) is sometimes indicated as, for example, SMQ 50 for SMQ having a DSM of 50. Phenol is the preferred phenolic compound for use in the present invention.

The term naphtholic component as used herein includes naphtol and suitable derivatives thereof, such as $C_1$–$C_5$ mono-, di- and tri-alkyl naphthol derivatives, hydroxy naphthol derivatives, sulfonate, amino or hydroxy acid naphthol derivatives, $C_1$–$C_5$ mono-, di- and tri-alkoxy naphthol derivatives and $C_1$–$C_5$ mono-, di- and tri-alkene naphthol derivatives. Such derivatives must be sufficiently water-dispersible to react with PVA and the aldehyde to form a gel.

Examples of suitable sulfonic acid derivatives, are 1-naphthol-4,8-disulfonic acid, 2-naphthol-3,6-disulfonic acid, 2-naphthol-6,8-disulfonic acid, 1-naphthol-2-sulfonic acid, 1-naphthol-4-sulfonic acid, 2-naphthol-6-sulfonic acid, naphthol Yellow S (8-hydroxy-5,7-dinitro-2-naphtholenesulfonic acid disodium salt); and amino-sulfonic acid derivatives of naphthoic acid, such as 1-naphthol-8-amino-3,6-disulfonic acid.

If more than one alkyl-, alkoxy- or alkene- substituent is present on the naphthol derivative, such substituents may be the same or different, as will be apparent to those skilled in the art. Additionally, mixed derivatives of naphthols may also be used, i.e., the derivatives containing mixed substituents on the naphthol ring, e.g., alkyl and alkene, alkyl and alkoxy or alkene and alkoxy substituents. Examples of suitable $C_1$–$C_5$ alkyl naphthol derivatives are 2-methyl-1-naphthol, 2-ethyl-1-naphthol, 2-propyl-1-naphthol, 2-butyl-1-naphthol, 2-pentyl-1-naphthol, 2,3-dimethyl-1-naphthol, 2,5-dimethyl-1-naphthol, 2,7-dimethyl-1-naphthol, 2-methyl-3-ethyl-1-naphthol, 2-methyl-8-ethyl-1-naphthol, 2-methyl-3-butyl-1-naphthol, 2-methyl-9-butyl-1-naphthol, 2,4-diethyl-1-naphthol, 2,7-diethyl-1-naphthol, 2-ethyl-4-propyl-1-naphthol, 2-ethyl-6-butyl-1-naphthol, 2-ethyl-7-pentyl-1-napthol.

Examples of suitable mixed alkyl/alkoxy napthols are 2-ethyl-3-methoxy-1-naphthol, and 3-butyl-4-ethoxy-1-naphthol.

Examples of suitable alkene naphthols are 2,3-diethene-1-naphthol, 2,5-di-propene-1-naphthol, 2-ethene-3-1-butene-1-naphthol, 3-propene-6-1-pentene-1-naphthol. Examples of suitable mixed alkyl/alkene naphthols are 2-ethene-3-methyl-1-naphthol and 3-propene-4-butyl-1-naphthol.

Examples of suitable hydroxy acid naphthol derivatives are 1,2-dihydroxynaphthalene, 1,3-dihydroxynaphthalene, 1,4-dihydroxynaphthalene, 1,5-dihydroxynaphthalene, 1,6-dihydroxynaphthalene, 2,3-dihydroxynaphthalene, 2,6-dihdyroxynaphthalene and 2,7-dihydroxynaphthalene. Derivatives can be selected for faster or slower crosslinking (gelation) by the principles well known to those skilled in the art.

Any suitable water-dispersible aldehyde can be used in the practice of the invention. Thus, under proper conditions of use, both aliphatic and aromatic monoaldehydes, and also dialdehydes, can be used. The aliphatic monoaldehydes containing from one to about 10 carbon atoms per molecule are preferred. Representative examples of such aldehydes include formaldehyde, paraformaldehyde, acetaldehyde, propionaldehyde, butyraldehyde, isobutyraldehyde, valeraldehyde, heptaldehyde and decanal. Representative examples of dialdehydes include glyoxal, glutaraldehyde and terephthaldehyde. Various mixtures of such aldehydes can also be used in the practice of the invention. The term "water-dispersible" is employed generically herein to include both, those aldehydes which are truly water-soluble and those aldehydes of limited water solubility but which are dispersible in water or other aqueous media to be effective gelling agents. Formaldehyde is the preferred aldehyde compound used in the present invention.

Specific examples of suitable phenolic and water-dispersible aldehyde components are set forth in Swanson, U.S. Pat. No. 4,440,228, the entire contents of which are incorporated herein by reference. The preferred combinations of a phenolic and water-dispersible aldehyde components are phenol/formaldehyde and resorcinol/-formaldehyde.

Relative amounts of phenolic and aldehyde components are also set forth in Swanson. These amounts are small but effective to cause the gelation of an aqueous dispersion of the copolymer and the cross-linking agent. Thus, the amount of the phenolic component used herein is about 1 to about 10, preferably about 2 to about 8, and most preferably about 3 to about 6% by weight (% wt). Similarly, the amount of the naphtholic component is about 1 to about 10, preferably about 2 to about 8, and most preferably about 3 to about 6% wt. The amount of aldehyde is about 0.002 to about 15, preferably about 3 to about 10 and most preferably about 3 to about 7% wt. The above amounts are calculated on the basis of the total weight of the composition comprising the water, the polymer and the cross-linking agent.

If PVA having a lower degree of hydrolysis is used, e.g., about 85 to about 95% hydrolysis, the relative proportion thereof used in the synthesis of about 2.5 to about 7.5%. Conversely, if PVA having a higher degree of hydrolysis is used, e.g., about 95 to about 99% hydrolysis, lower amounts of PVA are used to produce a gel more resistant to syneresis. At such high degrees of PVA hydrolysis, higher amounts of PVA produce gels unduly susceptible to syneresis. Thus, for PVA having such a high degree of hydrolysis, the amount of PVA used is about 1 to about 3.0, preferably about 1.5 to about 2.7, and most preferably about 2.0 to about 2.5% by weight. Molecular weight of PVA also effects the amount of PVA used in the synthesis. Thus, generally, the higher the molecular weight of PVA at a given hydrolysis level, the lower relative amount of PVA need be used in the synthesis to obtain a stable gel. PVA used herein should have molecular weight of at least about 10,000, preferably at least about 100,000 and more preferably about 100,000 to about 600,000.

Any suitable method can be employed for preparing the cross-linked polymer compositions of the invention. Thus, any suitable mixing technique or order of addition of the components of the composition to each other can be employed which will provide a composition having sufficient stability to degeneration by the heat of the formation (in which the composition is to be used) to permit good penetration of the composition into said formation. However, it is ordinarily preferred to first dissolve or disperse the polymer in water before contacting the polymer with the other components. The mixing order can vary with the type of polymer (i.e., PVA or its derivative) used. Some suitable mixing orders, with the components named in order of mixing, include: water-polymer-phenolic component-aldehyde; water-phenolic component-polymer-aldehyde; phenolic component-polymer-water-aldehyde; water-polymer-aldehyde-phenolic component; water-polymer-naphtholic component-aldehyde; naphtholic component-aldehyde-polymer-water; and polymer-water naphtholic component-aldehyde. It is within the scope of the invention to moisten or slurry the polymer with a small amount, e.g., about 1 to about 6 weight percent, based on the weight of the polymer, of a small amount of a low molecular weight alcohol, e.g., $C_1$ to $C_3$ alcohols, as a dispersion aid prior to dispersing the polymer in water.

The gelled compositions of the invention can be prepared on the surface in a suitable tank equipped with suitable mixing means, and then pumped down the well and into the formation employing conventional equipment for pumping gelled compositions. However, it is within the scope of the invention to prepare said compositions while they are being pumped down the well. For example, a solution of the polymer in water can be prepared in a tank adjacent the wellhead. Pumping of this solution through a conduit to the wellhead can then be started. Then, downstream from the tank, a suitable connection can be provided for introducing a cross-linking agent of this invention. As will be understood by those skilled in the art, the rate of introduction of the cross-linking agents into the conduit will depend upon the pumping rate of the polymer solution through the conduit. Any of the above-mentioned orders of addition can be employed in such an in situ technique. Mixing orifices or baffles can be provided in the conduit, if desired.

The cross-linked polymer compositions of the invention have a gelled consistency and they are very stable even under the extreme conditions of temperature encountered in steam flooding of underground formations.

After the gelled composition is injected into the formation, the oil recovery process is conducted in the usual manner, i.e., a displacing fluid, which is miscible or immiscible with the oil, is injected into the formation and the oil is subsequently recovered in a conventional manner. Suitable oil-miscible displacing fluids are carbon dioxide ($CO_2$), carbon monoxide (CO), methane, ethane, propane, butane, natural gas, liquid petroleum gas and mixtures thereof. $CO_2$ is the preferred oil-miscible displacing fluid. Suitable oil-immiscible displacing fluids are carbon dixide, used under oil-immiscible conditions, water or an aqueous fluid, nitrogen, ambient air, steam, flue gas, and mixtures thereof. Because the cross-linked polymer of the invention is substantially stable at high temperatures, of up to 400° F., and does not undergo syneresis at such temperatures, it is preferably used in conjunction with steam flooding of underground oil formations.

The gelled composition of the invention may also be used in a so-called WAG (Water Alternating Gas) process, well known to those skilled in the art. In such a process, the injection of slugs of water is alternated with the injection of slugs of gas, such as $CO_2$. If a WAG process is used with the gelled composition of the invention, the gelled composition or compositions are injected into the formation with one or more water slugs.

After the miscible transition zone is established between the formation oil and the displacing fluid, a driving fluid may be injected through the injection well to displace the oil, the transition zone and the displacing fluid through the formation towards the production well from which the oil is produced. The driving fluid is injected for a sufficient time to effect the displacement of the formation oil to the production well until either all of the oil has been displaced from the formation or until the economical limit of the ratio of the driving fluid to the formation oil has been reached.

The driving fluid (also referred to herein as a drive fluid) used in the process of the invention may be any fluid known to those skilled in the art as suitable for that purpose, but preferably it is a fluid selected from the group consisting of water, brine, methane, carbon dioxide, nitrogen, air, steam, separator gas, natural gas, flue gas and mixtures thereof. The driving fluid may contain additives, such as a surfactant, to maintain efficient displacement thereof.

It is within the scope of the invention to precede the injection of the gelled composition into the well and out into the formation with a preflush of a suitable cooling fluid, e.g, water. Such fluids cool the well tubing and formation and extend the useful operating temperature range of the gelled composition. The volume of the cooling fluid injected into the well can be any suitable volume sufficient to significantly decrease the temperature of the formation being treated, and can vary depending upon the characteristics of the formation. For example, amounts up to 20,000 gallons or more can be used to obtain a temperature decrease on the order of 100° to 250° F.

The copolymers of this invention are dissloved in water, at concentrations of about 1,000 to about 20,000 ppm, preferably about 2,000 to about 5,000 ppm, to provide the desired viscosity. The solution is then injected into the formation, where it selectively blocks the more highly permeable regions, to control the subsequent flooding operation which may be carried out in a conventional manner. Injection of the solution into the formation may be carried out in a conventional manner using an injection well which extends from the surface of the earth into the formation, e.g., as described in U.S. Pat. Nos. 4,078,607, 3,305,016, 4,076,074, 4,009,755 and 4,069,869, to which reference is made for the descriptions of typical procedures which can be used herein. Briefly, the thickened aqueous liquid is injected into the formation through the injection well and in the formation it enters the more highly permeable stratum or strata in preference to the less permeable regions because of its viscosity. Once in place in the more highly permeable regions, the gel controls subsequent flooding operations by diverting the flood liquid, such as steam, water or $CO_2$, to the less permeable or "tight" zones, increasing recovery from these zones. The amount of the viscous solution which is injected into the reservoir will generally be from about 10% to about 100% of the pore volume of the high permeability stratum or strata.

Because the compositions of the cross-linked polymers may be readily varied, e.g., by changing the amount of the cross-linking agent or the degree of PVA hydrolysis, the viscosifying effects of the polymers may also be varied. This invention therefore offers the possibility of formulating polymers according to specific reservoir conditions.

Because the polymers possess a viscosifying effect in aqueous solutions, they may also be used for mobility control purposes in waterflooding operations. In carrying out waterflooding in this way, at least a portion of the water injected into the oil-bearing formation through the injection well contains the cross-linked polymer in an amount which is sufficient to thicken the water and increase its viscosity to a point where it is closer to that of the oil, so as to increase the efficiency of the displacement of the oil from the formation. Normally, the amount of the polymer should be sufficient to achieve a mobility ratio equal to or less than 1 for the reservoir oil to the injected water, as described in U.S. Pat. No. 3,025,237, to which reference is made. In many cases, the relative permeabilities of the reservoir to oil and water are discounted in arriving at the mobility ratio so that the desired viscosity of the thickened water will be at least that of the reservoir oil, typically in the range of 1 to 4 times that of the reservoir oil. Continued injection of the water drives the displaced oil through the formation to the production well from which it is recovered. In order to reduce the cost of the flood, it may be preferable to include the copolymer in only the initial portion of the flooding water; the concentration of the polymer may be decreased gradually or stepwise after the initial portion and the portion which is injected last may be free of the copolymer entirely. In this manner, a progressive decrease in the viscosity of the flood water is achieved.

The following Examples further illustrate the essential features of the invention. However, it will be apparent to those skilled in the art that the specific reactants and reaction conditions used in the Examples do not limit the scope of the invention.

EXAMPLES 1-13

(Synthesis of Cross-Linked PVA Gels)

Cross-linked PVA samples were obtained by combining 88% hydrolyzed polyvinyl alcohol, obtained from Aldrich Chemical Company, Inc., Milwaukee, Wisconsin, with phenol and formaldehyde in varying proportions and at varying concentrations of the PVA, as set forth in Table 1, below. The weight ratio of formaldehyde:phenol was 1.05:1 for all examples. The preparation procedure of the polymers was substantially the same for all examples. The preparation of Example 1 polymer, detailed below, is representative. The cross-linked polymer of Example 1 was prepared by weighing into ampules and shaking the appropriate amounts of PVA solution (10%, prepared by refluxing solid PVA [Aldrich, 88% hydrolized, 125,000 MW] in deionized water), phenol/formaldehyde solution (26% phenol in Formalin), and water (deionized).

The ampules were deareated by three consecutives cycles of evacuating the ampules and filling them with nitrogen. The vacuum used in this procedure was equivalent to vapor pressure of water at ambient temperature.

EXAMPLES 14-26

(Thermal Stability of Cross-Linked PVA Gels)

Thermal stability of polymers of Examples 1-13 was measured by subjecting small samples thereof (about 10 gr) to a temperature of about 400° F. for various time periods. The samples, in small glass vials, were inserted into stainless steel bombs (1" O.D. tubing with Swagelock caps), partially surrounded with water, sealed, placed in an oven, and maintained at the temperature of about 400° F. for the length of time indicated in Table 1. After the testing period, the degree of syneresis of each sample was determined by cooling the bomb to ambient temperature, removing the vial from the bomb, estimating the size of the polymer plug by measuring the height and diameter of the gel plug, and calculating the degree of syneresis (%) from the following equation:.

$$\% \text{ syneresis} = 100 \times \frac{(\text{Volume sample} - \text{Volume [gel]})}{\text{Volume sample}}$$

where "volume sample" is the initial volume of the sample before the heating treatment is commenced; and "volume gel" is the final volume of the gel in the vial after the heating treatment is terminated.

TABLE 1

PVA/Phenol/Formaldehyde Gel Stability at 400° F.
(Formaldehyde:Phenol weight ratio = 1.05:1)

| Ex. | Polymer of Ex. | PVA (% by wt) | Phenol (% by wt) | Syneresis (%) | | | | | |
|---|---|---|---|---|---|---|---|---|---|
| | | | | 1 Day | 4 Days | 1 Week | 4 Weeks | 5 Weeks | 10 Weeks |
| 14 | 1 | 2.5 | 0.5 | >50 | | | | | |
| 15 | 2 | 2.5 | 1 | >50 | | | | | |
| 16 | 3 | 2.5 | 2 | 50 | | | | | |
| 17 | 4 | 2.5 | 8 | 20–30 | 25 | 15 | 30 | 30 | 30 |
| 18 | 5 | 5 | 0.5 | 20 | >50 | | | | |
| 19 | 6 | 5 | 1 | 20 | 50 | | | | |
| 20 | 7 | 5 | 2 | 50 | | | | | |
| 21 | 8 | 5 | 4 | 25 | 25 | 20 | 30 | 30 | 30 |
| 22 | 9 | 5 | 8 | 20 | 30 | 15 | 20 | * | |
| 23 | 10 | 7.5 | 0.5 | 0 | 50 | | | | |
| 24 | 11 | 7.5 | 1 | 30 | 50 | | | | |
| 25 | 12 | 7.5 | 2 | 30 | >50 | | | | |
| 26 | 13 | 7.5 | 8 | 10 | <10 | 5 | 5 | 5 | 5 |

* Indicates that sample broke.

The data indicates that thermally stable polymers, i.e., those undergoing not more than 30% syneresis after four (4) weeks, are obtained from polymers prepared with at least 2.5% by weight of PVA, and at least 3% phenol.

EXAMPLES 27–31

(Comparative Polymers)

PVA, used in Examples 1–13, was cross-linked with a melamine cross-linking agent to compare the thermal stability of the resulting cross-linked polymer to that of the invention.

The PVA was cross-linked with melamine, obtained from American Cyanamide Company, Wayne, N.J., under the name of Parez 613, in a $N_2$-purged sealed ampules heated to 210° F. Various amounts of the PVA and the cross-linking agent were used, as detailed in Table 2.

TABLE 2

(PVA Cross-linked With Melamine)

| Example | PVA (% by wt) | Melamine (% by wt) |
|---|---|---|
| 27 | 2.5 | 4 |
| 28 | 5.0 | 2 |
| 29 | 5.0 | 4 |
| 30 | 7.5 | 2 |
| 31 | 7.5 | 4 |

EXAMPLES 32–36

(Thermal Stability of Comparative Polymers)

The thermal stability of the polymers of Examples 27–31 was tested in the ampules in which they were prepared. The testing was conducted by aging all of the gel samples at 210° F. and periodically observing the gels for quality. Two of these samples, Examples 28 and 31, which appeared to be the most stable, were prepared in ampules, sealed in bombs, and aged overnight at 400° F. The tests indicated that the comparative polymers were thermally unstable, at the steam testing temperature (400° F.), as indicated by gel breakdown to form a soupy liquid or mostly liquid with only small pieces of gel remaining.

EXAMPLES 37–41

(Synerisis of Gels Made from Highly Hydrolyzed PVA)

Five (5) different samples of gels were prepared substantially in the manner of Examples 1–13 and the thermal stability thereof at 400° F. was tested substantially in the manner of Examples 14–26. The relative proportions of gel components used to prepare the gels and the results of thermal stability evaluation are summarized in Table 2. The PVA used to prepare the samples was 99% hydrolyzed and it had molecular weight of 133,000. A mixture of phenol and formaldehyde was used as a cross-linking agent.

TABLE 2

| Example | PVA (Wt. %) | Phenol (Wt. %) | Formaldehyde (Wt. %) | Days at 400° F. | NaOH % | Syneresis % |
|---|---|---|---|---|---|---|
| 37 | 2.5 | 3 | 3 | 38* | 0 | 0 |
| 38 | 2.5 | 3 | 3.9 | 14* | 0 | 0 |
| 39 | 2.5 | 8 | 8.4 | 90 | 0 | 0 |
| 40 | 5 | 8 | 8.4 | 90 | 0 | 10 |
| 41 | 2.5 | 8 | 8.4 | 90 | 0.08 | 10 |

*sample container broke

The data of Table 2 indicates that the gels of these examples are exceptionally stable at 400° F., thereby making them ideal candidates for applications in steam flooding operations.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method for controlling the permeability of a subterranean formation under steam flooding conditions, which comprises injecting into the formation an aqueous polymer obtained by cross-linking polyvinyl alcohol with a cross-linking agent which is a mixture of a phenolic component and an aldehyde or a mixture of a naphtholic component and an aldehyde.

2. A method of claim 1 wherein the polyvinyl alcohol is hydrolyzed prior to the cross-linking thereof.

3. A method of claim 2 wherein the polyvinyl alcohol is hydrolyzed to the degree of about 50 to about 100%.

4. A method of claim 3 wherein the aldehyde of the cross-linking agent is an aliphatic monoaldehyde, an aromatic monoaldehyde, a dialdehyde or mixtures thereof.

5. A method of claim 4 wherein the cross-linking agent is a mixture of phenol and formaldehyde or a mixture of resorcinol and formaldehyde.

6. A method of claim 5 wherein the steam flooding conditions include a temperature of about 400° F.

7. A method of claim 6 wherein the polyvinyl alcohol is hydrolyzed to the degree of about 85 to about 95% wt.

8. A method of claim 7 wherein the amount of the polyvinyl alcohol in an aqueous solution used to prepare the polymer is about 2.5 to about 7.5% wt.

9. A method of claim 5 wherein the polyvinyl alcohol is hydrolyzed to the degree of about 96 to about 99% wt.

10. A method of claim 9 wherein the amount of the polyvinyl alcohol in an aqueous solution used to prepare the polymer is about 1.0 to about 3% wt.

11. A method of claim 10 wherein the amount of the polyvinyl alcohol in an aqueous solution used to prepare the polymer is about 1.5 to about 2.7% wt.

12. A method of claim 11 wherein the amount of the polyvinyl alcohol in an aqueous solution used to prepare the polymer is about 2.0 to about 2.5% wt.

* * * * *